April 24, 1951

J. E. LISBON 2,550,197

NUTCRACKER AUTOMATICALLY ADJUSTED
TO CRACK NUTS OF VARIOUS SIZES

Filed June 9, 1950

INVENTOR.
Julius E. Lisbon
BY
ATTORNEY

Patented Apr. 24, 1951

2,550,197

UNITED STATES PATENT OFFICE 2,550,197

NUTCRACKER AUTOMATICALLY ADJUSTED TO CRACK NUTS OF VARIOUS SIZES

Julius E. Lisbon, Oakland, Calif.

Application June 9, 1950, Serial No. 167,173

3 Claims. (Cl. 146—16)

This invention relates to a nutcracker, and particularly an improved nutcracker, as is disclosed in my prior Patent 2,464,983 of March 22, 1949 and which is particularly suited to the cracking of large, medium and small nuts, crab-legs, shell fish and the like.

As presently constructed conventional nutcrackers are designed for the cracking of medium sized nuts so if one attempts to crack a large nut or a small nut, difficulty is encountered. With large nuts, the jaws of the cracking device must be spread apart such a distance that the device cannot be accommodated and gripped in one hand, while with small nuts, an insecure hold is frequently effected and the nut slips away from between the jaws. In my aforementioned patent I provided a structure which automatically adjusted to crack nuts and the like which are of various sizes. This I achieved by providing an adjustable jaw which was moved selectively over a retaining member carried on one of the two hinged handles. While this structure was quite satisfactory, I have found that a more positive operation can be provided by making one of the handles in two parts and utilizing the initial relative movement between these to lock the movable nut engaging jaw.

It is in general the broad object of the present invention to provide an improved nutcracker readily adaptable to the cracking of large, medium and small nuts.

A further object of the present invention is to provide a simple, novel and adjustable nutcracker which can be adjusted to accommodate for cracking a nut of any desired size.

The invention includes other objects and features of advantage, some of which, together with the foregoing, will appear hereinafter wherein the present preferred form of nutcracker of this invention is disclosed.

In the drawings accompanying and forming a part hereof, Figure 1 is a side elevation showing a nutcracker of the present invention adjusted to the cracking of the largest size of nuts.

Figure 2:
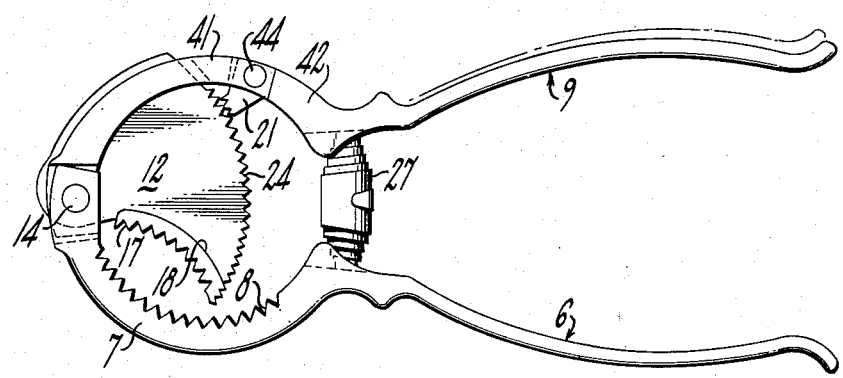
Figure 2 is a side elevation, similar to Figure 1, but showing the nutcracker adjusted for cracking a nut of a very small size.
Figure 3:
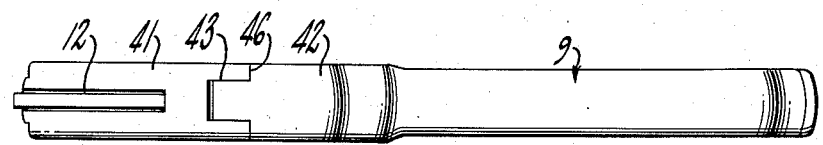
Figure 3 is a plan view of the nutcracker.
Figure 4:
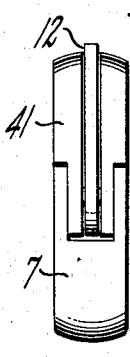
Figure 4 is an end elevation of the nutcracker as shown in Figure 2.

Referring to the drawings. I provide a first handle 6 having an arcuate jaw portion 7 thereon including a plurality of serrations or teeth 8 to grip the surface of a nut. The arcuate jaw portion is preferably of such size and curvature as to accommodate a wide range in nuts. The device also includes a second handle generally designated at 9, the two handles being urged apart by spring 27. In accordance with this invention, handle 9 is made in two parts 41 and 42, part 41 having a slot 11 therein in which a segment 12 is movable. The first handle 6, the second handle 9 and the segment 12 are hinged upon a common hinge support provided by a riveted pin 14, the three being movable about the pin as a common hinge support. The parts 41 and 42 of the handle are movable with respect to one another to a limited extent, between the dotted line position and the full line position as is shown in Figure 2, part 41 being bifurcated just beyond slot 11 and receiving the reduced end 43 of part 42, the two being hinged on pin 44. Shoulders 46 on the reduced end 43 of part 42 engage the bifurcated end of part 41 when the handles are drawn together, this movement being utilized as will be explained.

The movable segment 12 includes a jaw portion 16 thereon having a plurality of teeth or serrations 17 preferably formed of a size and curvature similar to that of jaw 7. On each side of the segment is an arcuately formed flange portion 18; as appears in Figure 1, the flange portion 18 rests against the arcuate portion of handle 9 in its position of maximum adjustment.

To provide for adjustment of the movable segment 12 throughout a plurality of positions of adjustment and its retention in any adjusted position, the end 43 of handle part 42 is provided with an extension 21 having a plurality of teeth 22 thereon adapted to be selectively engaged with any one of teeth 24 on the outer peripheral edge of the movable segment 12. Selective engagement of the teeth on extension 21 with the teeth on the movable segment serves to lock the segment in a desired position of adjustment.

Figure 1:
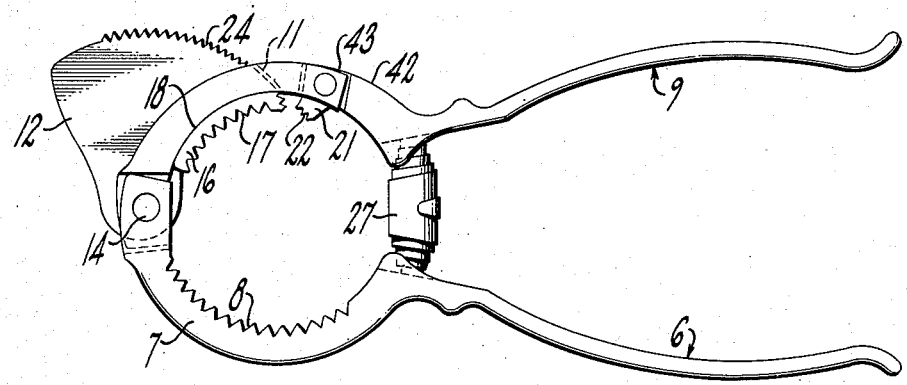

In that position in which the segment is shown in Figure 1, the nutcracker is adjusted to the largest object it can accommodate. When it is desired to move the segment to diminish the space between the jaw portion 16 on the movable segment and jaw portion 7 on handle 6, it is only necessary to move handles 6 and 9 apart and rotate the segment to a desired position of adjustment.

It is not necessary to adjust first the segment 12 to fit a nut for, upon opening movement of handles 6 and 9, extension 21 is released from the teeth 24 on the segment. If a nut is then placed between jaws 7 and 17 and the handles moved together, the teeth on extension 21 are engaged with teeth 24 upon the first portion of the movement. Continued movement of the handles then moves segment 12 toward jaw 7 so that the adjustment for any nut size is more or less automatic. With the segment in that position in which it is shown in Figure 1, a nut or other object is inserted. The segment, upon release, then falls into engagement with the object and closing movement of the handle is effective to compress the engaged object and apply a crushing pressure.

Upon reference to the drawing it will be observed that the length of the jaw on segment 12 is shorter than jaw 7 so that the leverage applied between jaws 7 and 17 is relatively great and comparatively constant. This ensures an adequate and substantially uniform force application to an object between the jaws.

From the foregoing, I believe it will be apparent that I have disclosed a new and novel form of nutcracker, one readily adjusted to the desired position so that a large nut, a medium sized nut, or a small nut can be selectively cracked as desired, the handles of the nutcracker being in any desired relative position irrespective of the nut size so that the hand size of the person manipulating the cracker is not important while a great force is smoothly and evenly applied and the nut is cracked and not shattered.

I claim:

1. A nutcracker comprising a first handle having a jaw on the inner surface thereof for cracking engagement with a nut, a second handle having a first and a second portion hinged together, said first portion having a slot therein opposite the jaw on the first handle, a movable jaw segment, a pin providing a common hinge support for the first and second handles and for the movable segment, said segment being selectively movable in said slot in the first portion of the second handle and having a jaw thereon for cooperation with said first mentioned jaw for cracking a nut positioned between the jaws, said movable segment having a toothed surface extending arcuately about said pin as a center, and a segment tooth surface engaging member carried by the second portion of said second handle and movable to engage and lock said segment in a nut-cracking position upon closing movement of said handles and to release said segment upon opening of said handles.

2. A nutcracker comprising a first handle having a jaw on an inner surface thereof for cracking engagement with a nut, a second handle having a first portion and a second portion hinged together for relative movement therebetween, a movable jaw segment, a pin providing a common hinge support for the first and second handles and for the movable segment, said segment being selectively movable on said second handle and having a jaw thereon for cooperation with said first mentioned jaw for cracking a nut positioned between the jaws, said movable segment having a toothed surface extending arcuately about said pin as a center, and a segment tooth surface engaging member carried by the second portion of said second handle and movable to engage and lock said segment in a nut-cracking position upon closing movement of said handles and to release said segment upon opening movement of said handles.

3. A nutcracker comprising a first handle having a jaw on an inner surface thereof for cracking engagement with a nut, a second handle having a first portion and a second portion hinged together for relative movement therebetween, a movable jaw segment, a pin providing a common hinge support for the first and second handles and for the movable segment, said segment being selectively movable on said second handle and having a jaw thereon for cooperation with said first mentioned jaw for cracking a nut positioned between the jaws, said movable segment having a toothed surface extending arcuately about said pin as a center, and an extension on said second portion of the second handle adjacent to the hinge thereof with the first portion and having teeth thereon, said extension being movable to engage and lock said segment in a nut-cracking position upon closing movement of said handles and to release said segment upon opening movement of said handles.

JULIUS E. LISBON.

REFERENCES CITED

The following references are of record in the file of this patent:

UNITED STATES PATENTS

| Number | Name | Date |
|---|---|---|
| 2,269,306 | Davis | Jan. 6, 1942 |
| 2,464,983 | Lisbon | Mar. 22, 1949 |
| 2,526,273 | Rimes | Oct. 17, 1950 |